United States Patent [19]
Schmidt

[11] Patent Number: 5,984,715
[45] Date of Patent: Nov. 16, 1999

[54] END CAPSULE FOR A CABLE PROBE

[75] Inventor: Robert Schmidt, Steinen, Germany

[73] Assignee: Endress + Hauser GmbH + Co., Maulburg, Germany

[21] Appl. No.: 08/967,523

[22] Filed: Nov. 11, 1997

[30] Foreign Application Priority Data

Dec. 20, 1996 [EP] European Pat. Off. .............. 96120580

[51] Int. Cl.⁶ ..................................................... H01R 11/18
[52] U.S. Cl. ............................................ 439/482; 439/441
[58] Field of Search ..................................... 439/441, 482, 439/483, 439, 440, 169, 219, 461, 462, 587, 865, 804, 891; 318/727; 324/663

[56] References Cited

U.S. PATENT DOCUMENTS

| | | |
|---|---|---|
| 2,973,477 | 2/1961 | Lerner . |
| 3,062,994 | 11/1962 | Mesh . |
| 5,061,892 | 10/1991 | O'Hara ..................................... 439/482 |
| 5,484,306 | 1/1996 | Mawby et al. ........................... 439/482 |

FOREIGN PATENT DOCUMENTS 42 24 635   1/1994   Germany .

*Primary Examiner*—Paula Bradley
*Assistant Examiner*—Alexander Gilman
*Attorney, Agent, or Firm*—Bose McKinney & Evans LLP

[57] ABSTRACT

An end capsule for a cable probe which is easy to assemble, has a low number of sealing points, has a small external diameter and can be reduced to a desired length by the user is specified. This capsule comprises a cup (1), a cover (2), an insert (3) in which the cable is fixed, a sealing element (6) and a plug (7). The sealing element (6) has a first outwardly conical portion (62), which bears by an inner annular face against the cable in a sealing manner, and a second inwardly conical portion (63), which bears by an outer annular face (66) against an inner annular face of the cup (1) in a sealing manner. The cover (2) is pressed by an end face (24) against an annular face (74), facing away from the sealing element, of the plug (7) and the cable is led through the cover (2), the plug (7) and the sealing element (6) and into the insert (3).

10 Claims, 2 Drawing Sheets

END CAPSULE FOR A CABLE PROBE

The invention relates to an end capsule for a cable probe.

Cable probes are used in particular for capacitive filling level measurement. The cable serves as a measuring electrode, which is supplied with an AC voltage. The measured variable to be sensed by a measuring circuit is the capacitance of a capacitor formed by the measuring electrode and a counterelectrode. When measuring the filling level in a vessel, the counterelectrode may be, for example, the wall of the vessel. The medium of which the filling level is to be measured fills a space between the two electrodes in dependence on the filling level. The capacitance of the capacitor consequently changes in dependence on the filling level.

In practice, measuring electrodes fully coated with an insulating material are very often used. Customary materials for the insulation are polyvinyl chloride, polypropylene, polyethylene and fluoropolymers, for example polytetrafluoroethylene. Fluoropolymers are distinguished by high chemical resistance.

The insulation represents, for example, an electrical isolation between a measuring circuit on the one hand and the medium being filled on the other hand. It has the effect, for example, that the measuring circuit is not subjected, or not subjected as much, to any electrical conductivity which the medium being filled may possess.

Such probes are often provided with an end capsule. The probe and end capsule are introduced into a vessel and the vessel opening is suitably closed, for example by a connecting housing of the probe. The end capsule serves, for example, as a weight, by which the cable is pulled taut in the vessel.

The end capsule always becomes particularly important whenever, on account of its special design, it is possible for the user to shorten his probe to a desired length, for example by cutting to length. The user consequently need only keep probes of one length in stock and can shorten them at any time to the length particularly required. This simplifies stockkeeping and increases flexibility, since such a probe can be used virtually universally.

The end capsule forms an insulation for an end of the cable possibly not provided with an insulating layer. This is always the case if the probe has been shortened to a desired length by cutting to length.

DE-A 42 24 635 describes an end capsule for a cable probe with a cylindrical cup, with a cover having a central bore, with an insert arranged in the cup,
 in which the cable is fixed and with a sealing element with a central bore,
 which bears by an inner annular face against the cable in a sealing manner, in which the cable is led through the cover and the sealing element and into the insert.

The cover and the cylindrical cup comprise a single component. The base of the cup is formed by a screw plug arranged on the side opposite to top side of the cover. In the cover there is provided a tubular seal, which is passed through by the cable and is braced against the cover and the cable by a pressure bushing. The pressure bushing is pressed in the direction toward the cover by a cylindrical helical spring arranged on the screw plug. A sleeve is arranged in the spring. Via an opening in a cover closing off the sleeve, the free end of the cable is to be pulled through said cover, bent back sharply and re-introduced into the sleeve in such a way that a portion of the cable and the bent-back end of the cable are arranged parallel to each other in the sleeve. In order that the cable is fixed thereby, the sleeve has an internal diameter which is equal to twice the diameter of the cable and the opening in the cover of the sleeve has a diameter which is approximately equal to the diameter of the cable. This fastening is not suitable for a rod probe.

One disadvantage of such an end capsule is that a seal has to be ensured at two locations, to be specific between cover and cable and between cup and screw plug.

A further disadvantage is that the specified fixing of the cable in the sleeve within the spring predetermines a minimum diameter of the end capsule which is distinctly greater than the diameter of the cable. As a result, a vessel opening through which the probe is to be introduced must also be of a corresponding size.

It is an object of the invention to specify an end capsule for a cable probe which is easy to assemble, has a low number of sealing locations, has a small external diameter and can be reduced to a desired length by the user.

For this purpose, the invention comprises an end capsule for a cable probe with a cylindrical cup, with a cover having a central bore, with a cylindrical insert arranged in the cup,
 which insert has a blind-hole bore,
  in which a cable is fixed and
  which has at the end, on the side facing the cover, a conically widened portion, with a sealing element with a central bore,
 which sealing element has an outwardly conical first portion,
  which bears by an inner annular face against the cable in a sealing manner,
 which has an inwardly conical second portion,
  which bears by an outer annular face against an inner annular face of the cup in a sealing manner, and with a plug with a central bore,
 which has a cone which is arranged at least partially within the sealing element, in which the cover is pressed by an end face against an annular face, facing away from the sealing element, of the plug and in which the cable is led through the cover, the plug and the sealing element and into the insert.

According to one embodiment of the invention, the taper of the outwardly conical first portion of the sealing element is greater than that of the inwardly conical second portion.

According to one embodiment of the invention, there is arranged inside the sealing element, between the first conical portion and the second conical portion, a shoulder on which the plug rests by an end face.

According to one embodiment of the invention, the taper of the outwardly conical first portion of the sealing element is greater than that of the conical portion of the blind-hole bore of the insert.

According to one embodiment of the invention, the taper of the inwardly conical second portion of the sealing element is greater than that of the cone of the plug.

According to one embodiment of the invention, the cover has a thread and is screwed into the cup.

According to one embodiment of the invention, the insert rests on a spring arranged on the base of the cup.

According to one embodiment of the invention, a shim is arranged between the base and the spring.

According to one embodiment of the invention, the insert consists of a metal, in particular of steel or high-grade steel, and the cup, the cover, the sealing element and the plug in each case consist of polyvinyl chloride, polypropylene, polyethylene or of a fluoropolymer, in particular of polytetrafluoroethylene.

According to one embodiment of the invention, components through which or into which the cable is to be led during assembly have openings or bores which in each case have at the end a portion of which the internal diameter varies in the axial direction in such a way that the cable is centered when it is led in.

The invention and its advantages are now explained in more detail with reference to the figures of the drawing, in which an exemplary embodiment is represented; identical elements are provided with the same reference numerals in the figures.

Figure 1:
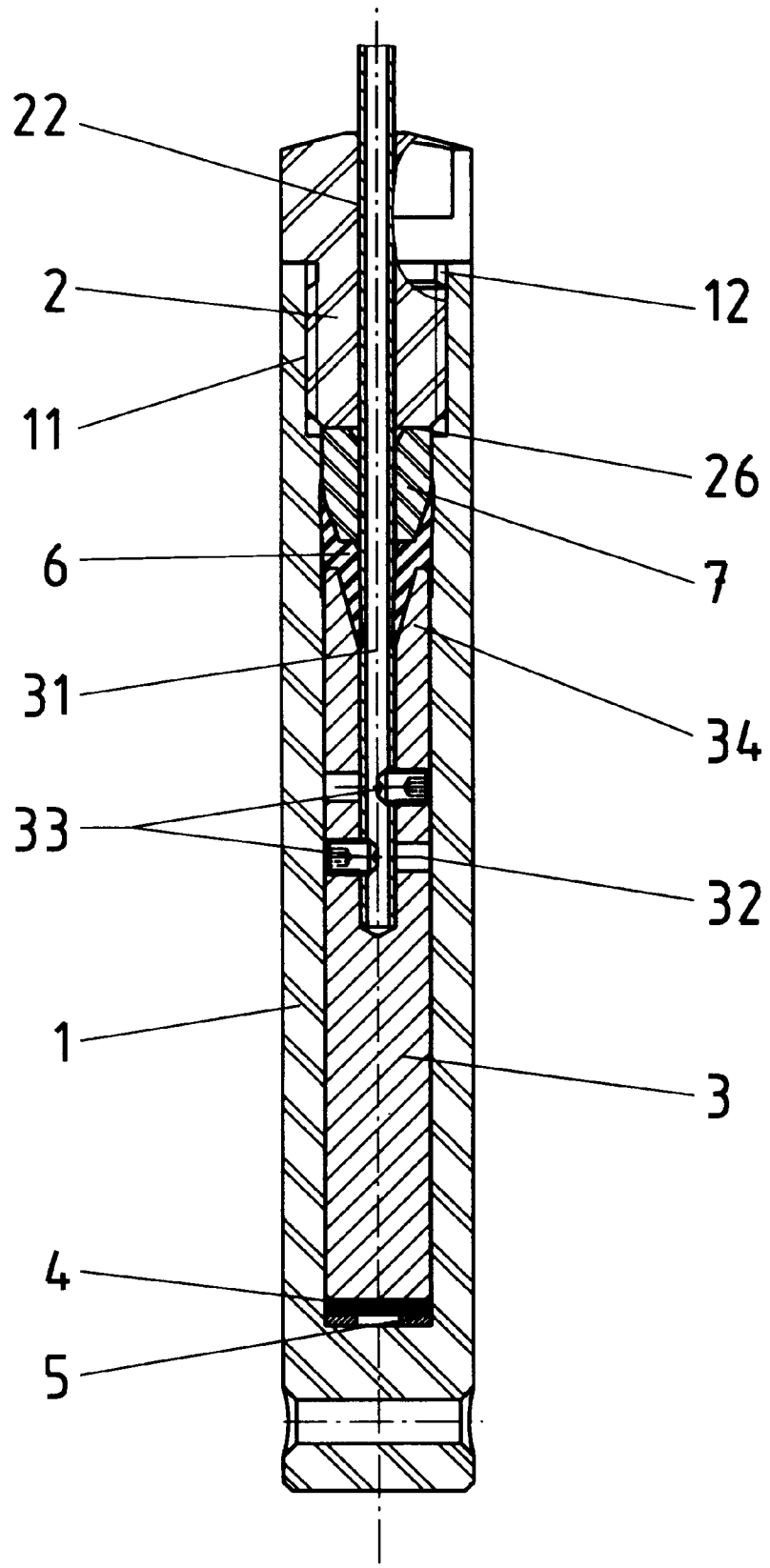
FIG. 1 shows a longitudinal section through an end capsule.

The exemplary embodiment represented in FIG. 1 of an end capsule according to the invention for a cable probe has a cylindrical cup 1, which is closed by a cover 2.

The cup 1 has at its open end a region 11 of slightly greater internal diameter. A thread 12 is arranged in said region.

The cover 2 has the form of a screw with a screw head and is screwed by a thread 21 into the cup 1. To facilitate the screwing in of the cover 2, the portion of the cover 2 corresponding to the screw head has two mutually opposite planar flats 24, 25.

Figure 2:
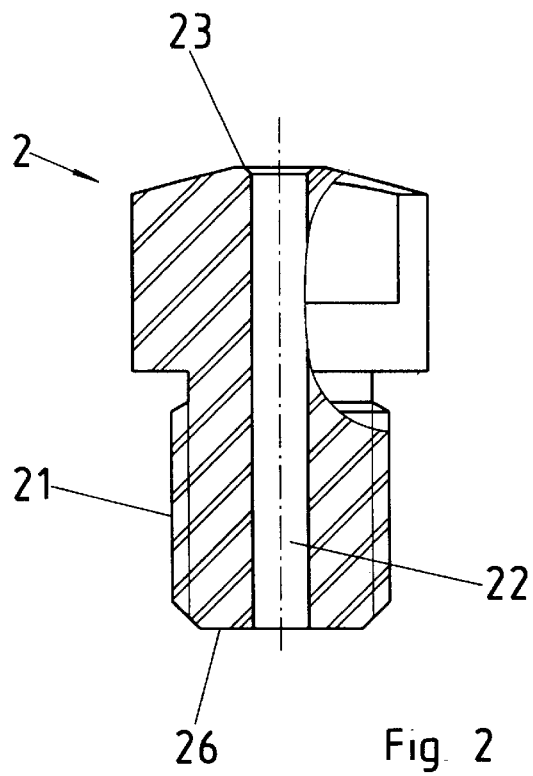
FIG. 2 shows a partially sectioned view of the cover from FIG. 1.
Figure 3:
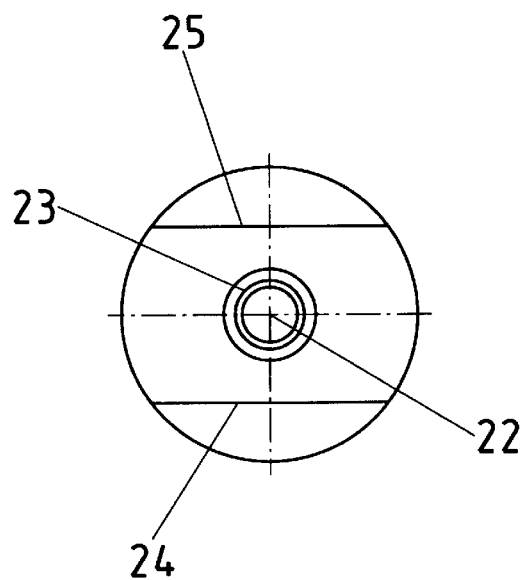
FIG. 3 shows a plan view of the cover from FIG. 1.

FIG. 2 shows a partially sectioned view of the cover 2 and FIG. 3 shows a plan view of the cover 2. The latter has a central bore 22, through which the cable is to be led in. To facilitate this operation, the bore 22 is widened conically on the side facing away from the cup. The widened region is provided in FIGS. 2 and 3 with the reference numeral 23.

In the case of an insulated probe, the cup 1 and cover 2 as well as all further components in contact with the medium preferably consist of the material of which the insulation of the cable consists. Examples of such a material are polyvinyl chloride, polypropylene, polyethylene and fluoropolymers, for example polytetrafluoroethylene. This ensures that all the components have the same high chemical resistance.

A cylindrical insert 3, for example of metal, in particular of steel, high-grade steel or lead, is arranged in the cup 1. Said insert rests in the cup 1 on a spring 4. A flat-wire compression spring is shown in the exemplary embodiment of FIG. 1. However, other springs, for example other types of helical springs or disk springs may also be used. In order to ensure that the spring 4 does not cut into the base of the cup 1 over time, a shim 5 is arranged between the spring 4 and the base of the cup.

The position of the spring 4 on the base of the cup 1 has the effect of compensating for the temperature-and/or fatigue-induced change in length of the overall cup 1.

The insert 3 has a blind-hole bore 31, in which the cable is fixed. For this purpose, there is provided at least one bore 32, for example a threaded bore, which runs perpendicularly with respect to the blind-hole bore 31 and into which the fixing screws 33, for example hexagon-socket set screws, are to be screwed.

On its side facing the cover, the blind-hole bore 31 has a conically widened portion 34.

Figure 4:
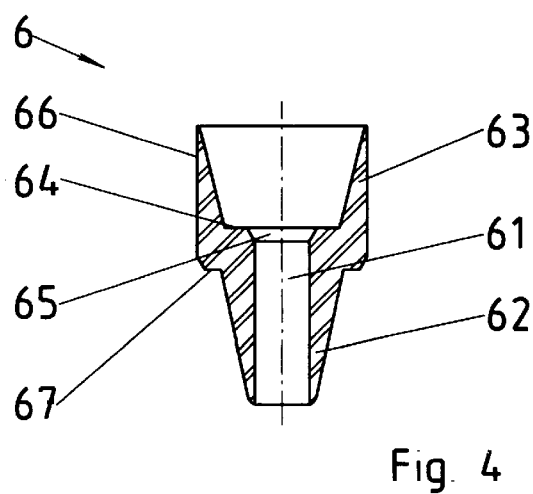
FIG. 4 shows a longitudinal section through the sealing element from FIG. 1.

On the side of the insert 3 facing away from the spring, a sealing element 6 is arranged in the cup 1. FIG. 4 shows a longitudinal section through this sealing element 6. It has a central through-bore 61 and substantially comprises two portions, to be specific an outwardly conical first portion 62 and an inwardly conical second portion 63.

The first portion 62 is, as shown in FIG. 1, arranged in the conically widened portion 34 of the blind-hole bore 31. It has an internal diameter which is equal to the external diameter of the cable. The second portion 63 has a cylindrical outer circumferential surface and has an external diameter which is equal to the internal diameter of the cup 1. The outwardly conical first portion 62 has on its side adjoining the second portion 63 an external diameter which is less than the internal diameter of the cup 1. Consequently, on the outside of the sealing element 6 there is a shoulder 67 between the two portions 62, 63.

Inside the sealing element 6, a shoulder 64 is arranged between the first portion 62 and the second portion 63. This shoulder is adjoined on the side facing away from the insert by the end of smaller diameter of the conical space inside the second portion 63. On the side of the shoulder 64 facing the insert, said shoulder is adjoined by the through-bore 61. The bore 61 has at its end adjoining the shoulder 64 a portion 65 which is conically widened in the direction away from the insert.

Figure 5:
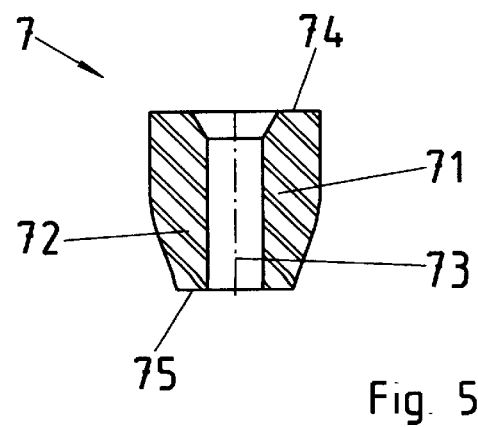
FIG. 5 shows a longitudinal section through the plug from FIG. 1.

Furthermore, a plug 7, shown in longitudinal section in FIG. 5, is provided. Said plug comprises a cylinder 71 and a cone 72 formed onto the latter at its end. Said cone is arranged at least partially in the inwardly conical portion 63 of the sealing element 6. The plug 7 has a central through-bore 73, the diameter of which corresponds to the diameter of the cable.

The sealing element 6 fills virtually the entire remaining free space inside the cup 1. There are, in particular, no gaps or cavities into which the material of the sealing element 6 could flow over time, for example induced by temperature or fatigue. This consequently provides a basis for long-term sealing.

The cable can be shortened by the user before assembly to a desired length, predetermined by the specific application.

During the assembly of the end capsule, the cover 2, the plug 7 and the sealing element 6 are to be pushed onto the cable in the order in which they are given here. Subsequently, the end of the cable led through these openings is to be led into the insert 3 and the fixing screws 33 are to be tightened.

All the components through which or into which the cable is to be led during assembly, to be specific the cover 2, the plug 7, the sealing element 6 and the insert 3, have openings or bores, which have in each case at the end a portion of which the internal diameter varies in the axial direction in such a way that the cable is centred when it is led in.

After placing the shim 5 and the spring 4 into the cup 1, the insert 3 is to be inserted into the latter and the cover 2 is to be screwed in.

As a result, the cover 2 is pressed by an end face 26 against an annular face 74 of the plug 7 facing away from the sealing element. Thus, a radially outwardly directed force is exerted via the plug 7 onto the internally conical portion 63 of the sealing element 6. The latter consequently bears by an outer annular face 66 against an inner annular face of the cup 1 in a sealing manner.

The materials mentioned for the cup 1 are relatively soft. It is thus possible that the cup 1 experiences a widening in the region of the aforementioned annular face. This widening is limited by the fact that the plug 7 cannot be pressed unrestrictedly into the sealing element 6. This movement is blocked as soon as the plug 7 rests by an end face 75 on the shoulder 64.

Similarly, a force acts via the plug 7 in the axial direction on the outwardly conical first portion 62 of the sealing element 6, causing this portion 62 to be pressed against the insert 3. Since the insert 3 consists of a metal, thus of a material which is very hard in comparison with the material of the sealing element 6, an inwardly directed force of reaction acts on the first portion 62. The first portion 62 consequently bears by an inner annular face against the cable in a sealing manner.

In the axial direction, the sealing element 6 can be pressed by the closing of the cover 2 into the insert 3 only until it rests by the shoulder face 67 on an annular end face of the insert 3.

The sealing element 6 is preferably designed in such a way that the taper of the outwardly conical first portion 62 is greater than the taper of the inwardly conical second portion 63.

In the ideal case, this achieves the effect that the sealing action between cable and insert 3 commences before the sealing action between cup 1 and sealing element 6.

The taper is a measure of the steepness of a cone or of a conical circumferential surface. A first cone has a greater taper than a second cone of the same height if the difference between the largest radius and the smallest radius of the first cone is greater than the same difference of the second cone.

The greater the taper of the first portion 62, the lower the force required to achieve sealing.

The tapers of all the cones are advantageously chosen to be as great as possible. As a result, the torque which is required for tightening the cover 2 is kept low. The smaller the forces required, the less there is the risk of material deformations in the region of the thread 12. End capsules with a small external diameter, for example of 20 mm, can thus be produced.

It also proves to be advantageous to make the taper of the outwardly conical first portion 62 of the sealing element 6 slightly greater than that of the conical portion 34 of the blind-hole bore 31 of the insert. As a result, when closing the cover 2, the forces are initially concentrated on the thin-walled tip of the first portion 62 facing the insert. The proportion of the force component which acts radially inward and is consequently responsible for the sealing action is all the greater the greater the taper of the first portion 62 of the sealing element 6 in comparison with that of the conical portion 34 of the blind-hole bore 31 of the insert 3.

The same applies analogously to the taper of the inwardly conical second portion 63 of the sealing element 6, that it is preferably slightly greater than the taper of the cone 72 of the plug 7. The proportion of the force component which acts radially outward and is consequently responsible for the sealing action is all the greater the greater the taper of the second portion 63 of the sealing element 6 in comparison with that of the cone 72 of the plug 7.

The cup 1, the cover 2, the sealing element 6 and the plug 7 preferably consist of the same material in each case. If, as is customary, the cable is insulated, the same material as that also used as the insulating material is thus preferably to be used for these components. Examples of such a material are polyvinyl chloride, polypropylene, polyethylene and fluoropolymers, for example polytetrafluoroethylene. Particularly good results are achieved with polytetrafluoroethylene if small amounts of a thermoplastic fluoropolymer are added to it. In addition to a strength which is adequate even for thin end capsules, this material offers the advantage of a very smooth surface. As a result, the sealing action is additionally improved.

Also advantageous for the sealing action is that the wall thicknesses of the two conical portions 62, 63 of the sealing element 6 are relatively small. If, in the case of the end capsule shown, an external diameter of 20 mm is taken as a basis, the wall thickness of the outwardly conical first portion 62 at its region adjoining the shoulder 67 may be, for example, about 5 mm and at its tip, for example, less than 1 mm. With such a thickness, the materials mentioned deform even under the effect of very low forces. The material of the sealing element 6 consequently flows into all the gaps to be filled. This is particularly important in the case of cable probes. The cables are, for example, plastic-sheathed wires or round stranded-wire cables. The circumferential surfaces of these cables are consequently not exactly cylindrical, even in the case of insulated wire probes, but have unevennesses. A cable with a diameter of about 4 mm may, for example, have variations in diameter of about ±0.1 mm. The sealing element 6 described compensates for these variations without any problem.

It goes without saying that the end capsule according to the invention can also be used for rod probes.

An end capsule according to the invention, with an external diameter of 20 mm, in which cup 1, cover 2, sealing element 6 and plug 7 consist of polytetrafluoroethylene can be used at temperature of up to 100° C. and at pressures of up to 25 bar.

I claim:

1. An end capsule for a cable of a cable probe, the end capsule comprising:

a cylindrical cup having an inner face and a base;

a cylindrical insert arranged in the cup, the insert having a blind-hole bore with a conically widened portion facing away from the base of the cup;

a sealing element having a central bore, an outwardly conical first portion with an inner face and an inwardly conical second portion with an outer face, the sealing element being arranged in the cup with the outwardly conical first portion abutting the conically widened portion of the insert and the inwardly conical second portion facing away from the insert;

a plug having a central bore, an annular face and a cone-shaped portion, the plug being arranged in the cup with the cone-shaped portion abutting the inwardly conical second portion of the sealing element and the annular face facing away from the sealing element; and a cover having a central bore and a cover end face, the cover end face abutting the annular face of the plug;

the cable of a cable probe extending through the central bore of the cover, the central bore of the plug, the central bore of the sealing element, and being fixed in the blind-hole bore of the insert, wherein a force pressing the cover and the plug towards the base of the cup causes the outer face of the inwardly conical second portion of the sealing element to press against the inner face of the cup in a sealing manner, and causes the inner face of the outwardly conical first portion of the sealing element to press against the cable in a sealing manner as a result of a reactive force acting from the conically widened portion of the insert.

2. The end capsule as claimed in claim 1, wherein the outwardly conical first portion of the sealing element has a first taper and the inwardly conical second portion of the sealing element has a second taper, the first taper being greater than the second taper.

3. The end capsule as claimed in claim 1, wherein the sealing element has an inner shoulder between the outwardly conical first portion and the inwardly conical second portion, and the cone-shaped portion of the plug has an end face, the end face of the cone-shaped portion of the plug abutting the inner shoulder of the sealing element.

4. The end capsule as claimed in claim 1, wherein the outwardly conical first portion of the sealing element has a first taper and the conically widened portion of the blind-hold bore of the insert has a second taper, the first taper being greater than the second taper.

5. The end capsule as claimed in claim 1, wherein the inwardly conical second portion of the sealing element has a first taper and the cone-shaped portion of the plug has a second taper, the first taper being greater than the second taper.

6. The end capsule as claimed in claim 1, wherein the cover has a first set of threads and the inner face of the cup has a second set of threads enabling the cover to be screwed in to the cup.

7. The end capsule as claimed in claim 1, wherein the insert is made of a metal, in particular of steel or high-grade steel; and the cup, the cover, the sealing element and the plug are each made of polyvinyl chlioride, polypropylene, polyethylene or of a fluoropolymer, in particular of polytetrafluoroethylene.

8. The end capsule as claimed in claim 1, wherein the central bore of the cover, the central bore of the plug, the central bore of the sealing element, and the blind-hole bore of the insert each have an end portion in which the internal diameter varies in the axial direction in such a way that the cable is centered when it is inserted.

9. The end capsule as claimed in claim 1, further comprising a spring arranged on the base of the cup, the insert abutting the spring.

10. The end capsule as claimed in claim 9, further comprising a shim, the shim being arranged between the base of the cup and the spring.

* * * * *